United States Patent
Zhan

(10) Patent No.: US 8,760,713 B2
(45) Date of Patent: Jun. 24, 2014

(54) CONTROLLING PRINTER ENERGY CONSUMPTION

(75) Inventor: Xiaonong Zhan, Foster City, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 881 days.

(21) Appl. No.: 12/828,071

(22) Filed: Jun. 30, 2010

(65) Prior Publication Data

US 2012/0002220 A1 Jan. 5, 2012

(51) Int. Cl.
G06K 15/02 (2006.01)
G06K 15/00 (2006.01)

(52) U.S. Cl.
USPC ............ 358/1.9; 358/1.13; 358/1.14; 399/37; 713/300; 713/323

(58) Field of Classification Search
USPC ......... 358/1.9, 1.13, 1.14, 468; 399/9, 37, 88; 713/300, 310, 323
See application file for complete search history.

(56) References Cited

U.S. PATENT DOCUMENTS

| | | | | |
|---|---|---|---|---|
| 5,758,040 | A * | 5/1998 | Ichimura et al. ............. | 358/1.14 |
| 6,996,728 | B2 | 2/2006 | Singh | |
| 7,222,245 | B2 | 5/2007 | Singh | |
| 8,049,919 | B2 * | 11/2011 | Yoshida ........................ | 358/1.15 |
| 8,078,888 | B2 * | 12/2011 | Kumakura .................... | 713/300 |
| 8,369,721 | B2 * | 2/2013 | Yamada ......................... | 399/37 |
| 2007/0280708 | A1 * | 12/2007 | Kamisuwa et al. ............. | 399/37 |
| 2008/0003033 | A1 * | 1/2008 | Aizawa ........................... | 400/62 |
| 2008/0109663 | A1 * | 5/2008 | Snyder et al. .................. | 713/300 |
| 2008/0239367 | A1 * | 10/2008 | Podl ............................... | 358/1.15 |
| 2009/0070604 | A1 * | 3/2009 | Kumakura ..................... | 713/310 |
| 2009/0110427 | A1 * | 4/2009 | Ishizuka ......................... | 399/88 |
| 2009/0129807 | A1 * | 5/2009 | Nicholson et al. .............. | 399/85 |
| 2009/0287806 | A1 * | 11/2009 | Hamilton et al. .............. | 709/223 |
| 2009/0314837 | A1 * | 12/2009 | Kataoka et al. ................ | 235/385 |
| 2009/0316178 | A1 * | 12/2009 | Tanaka ........................... | 358/1.14 |
| 2009/0324265 | A1 * | 12/2009 | Ito .................................. | 399/43 |
| 2010/0050175 | A1 * | 2/2010 | Jung et al. ...................... | 718/100 |
| 2010/0149576 | A1 * | 6/2010 | Morihara ....................... | 358/1.13 |
| 2010/0166442 | A1 * | 7/2010 | Yamada ......................... | 399/37 |
| 2011/0010571 | A1 * | 1/2011 | Dance et al. ................... | 713/323 |
| 2011/0058822 | A1 * | 3/2011 | Shioyasu et al. ................ | 399/8 |
| 2011/0304876 | A1 * | 12/2011 | Coffey et al. .................. | 358/1.15 |
| 2011/0317189 | A1 * | 12/2011 | Utoh .............................. | 358/1.13 |
| 2011/0317200 | A1 * | 12/2011 | Honda et al. .................. | 358/1.14 |
| 2012/0076523 | A1 * | 3/2012 | Kojima .......................... | 399/70 |
| 2012/0113474 | A1 * | 5/2012 | Imine ............................ | 358/1.16 |
| 2012/0200883 | A1 * | 8/2012 | Ikari .............................. | 358/1.15 |
| 2013/0063756 | A1 * | 3/2013 | Gray .............................. | 358/1.14 |

FOREIGN PATENT DOCUMENTS

JP 2006088590 A * 4/2006

* cited by examiner

*Primary Examiner* — Kimberly A Williams

(74) *Attorney, Agent, or Firm* — Osha Liang LLP

(57) ABSTRACT

A method for controlling printer energy consumption. The method includes identifying, during a first time interval, a quantity of energy consumed by a printer since commencement of the first time interval; generating a comparison by comparing the quantity of energy with a first energy threshold for the first time interval; and invoking an energy saving mode of the printer based on the comparison.

23 Claims, 7 Drawing Sheets

CONTROLLING PRINTER ENERGY CONSUMPTION

BACKGROUND

Although the demand for printed copies of electronic documents is decreasing because of recent improvements in computer displays, there are still those who generate hard copies of documents for purposes of reading the documents. For example, some readers may simply prefer reading a hard copy over staring at a computer screen. In other instances, copies of documents may be provided to a group of people at an informal presentation, or in other situations where reading from a projector screen or computer display is not convenient.

In addition, readers may prefer to instantly skip unnecessary pages by flipping pages of printed media (documents), or annotating by hand instead of scanning and inserting annotations using keyboard or mouse input devices. For the above reasons, printed media continues to be a dependable resource to read any type of document.

When reading is completed, readers typically recycle or discard the papers, with no intention of keeping the printed media, often because the contents are not very important or because the papers are not final drafts. Accordingly, in many instances, the readers do not have any preference for the quality of the documents that are printed.

SUMMARY

In general, in one aspect, the invention relates to a method for controlling printer energy consumption. The method comprises: identifying, during a first time interval, a quantity of energy consumed by a printer since commencement of the first time interval; generating a comparison by comparing the quantity of energy with a first energy threshold for the first time interval; and invoking, by the printer, an energy saving mode of the printer based on the comparison.

In general, in one aspect, the invention relates to a method for controlling printer energy consumption. The method comprises: identifying, during a time interval, a quantity of energy consumed by a plurality of printers since commencement of the time interval, wherein the plurality of printers comprises a first printer having a first energy consumption rating (ECR) and a second printer having a second ECR; generating a comparison by comparing the quantity of energy with an aggregate energy threshold for the time interval; receiving a print job for a first printer of the plurality of printers after generating the comparison; redirecting, based on the comparison and in response to the first ECR exceeding the second ECR, the print job to the second printer of the plurality of printers; and sending a message identifying the second printer to a source of the print job.

In general, in one aspect, the invention relates to a computer readable storage medium storing instructions for controlling printer energy consumption. The instructions comprising functionality to: identify, during a first time interval, a quantity of energy consumed by a printer since commencement of the first time interval; generate, a comparison by comparing the quantity of energy with a first energy threshold for the first time interval; and invoke an energy saving mode of the printer based on the comparison.

In general, in one aspect, the invention relates to a system for controlling printer energy consumption. The system comprises: a GUI configured to collect a selection of a energy saving mode; a printer driver operatively connected to the GUI and configured to send the selection of the energy saving mode and a print job to a printer; and an energy consumption module executing on a hardware processor and operatively connected to the print driver, wherein the energy consumption module is configured to: identify, during a first time interval, a quantity of energy consumed by the printer since commencement of the first time interval; generate a comparison by comparing the quantity of energy with a first energy threshold for the first time interval; and invoke, based on the selection and the comparison, the energy saving mode of the printer.

Other aspects of the invention will be apparent from the following description and the appended claims.

DETAILED DESCRIPTION

Figure 1:
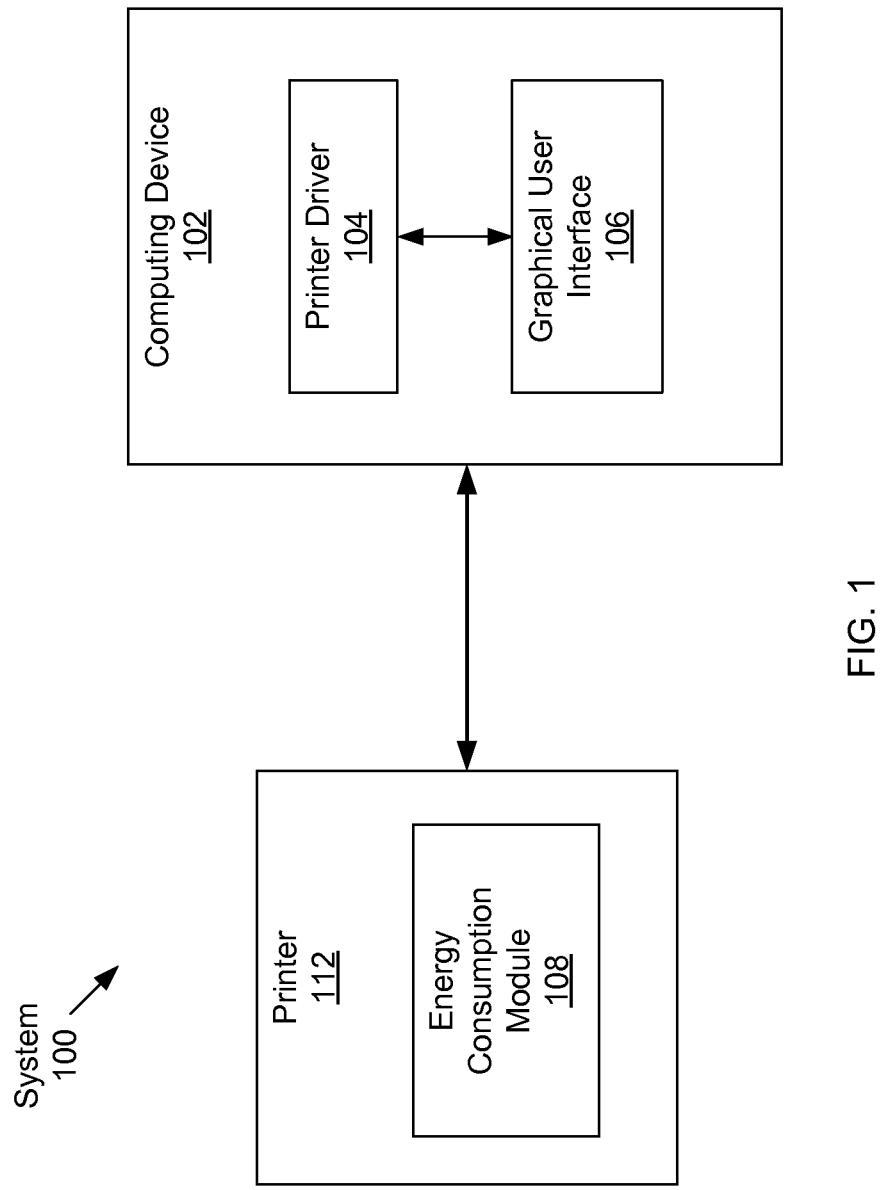
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a system and method for controlling energy consumed by a printer or a collection of printers during a series of time intervals. Once a printer has consumed the energy limit (or a percentage of the energy limit) assigned to the time interval, the printer is placed in one or more energy saving modes for the remainder of the time interval. Similarly, once a collection of printers have, as a group, consumed the energy limit (or a percentage of the energy limit) assigned to the time interval, incoming print jobs destined for a target printer are redirected to substitute printer having a lower energy consumption rating. The energy limit assigned to the present time interval may be dependent on the energy consumed, specifically energy consumption surpluses/deficits, in the previous time interval.

FIG. 1 shows a system (100) in accordance with one or more embodiments of the invention. As shown in FIG. 1, the system (100) has multiple components including a computing device (102) and a printer (112). The printer (112) may include an energy consumption module (108), while the computing device (102) may include a printer driver (104) and a GUI (106). The computing device (102) may be a personal computer (PC), a desktop computer, a mainframe, a server, a telephone, a kiosk, a cable box, a personal digital assistant (PDA), a mobile phone, a smart phone, etc. The printer (112) may be an inkjet printer, a laser printer, a liquid crystal display (LCD) printer or light emitting diode (LED) printer, a dotmatrix printer, a dye sublimation printer, a solid ink printer, a plotter, a three-dimensional (3D) printer, etc. There may be a direct connection (e.g., universal serial bus (USB) connection) between the computing device (102) and the printer (112). In one or more embodiments of the invention, the printer (112) is part of a photocopier (not shown). In one or more embodiments of the invention, the printer (112) and the computing device (102) are part of a photocopier (not shown). Alternatively, the connection linking the computing device (102) and the printer (112) may correspond to a network having wired and/or wireless segments.

In one or more embodiments of the invention, the computing device (102) executes a user application (not shown). The user application is a software application operated by a user and configured to obtain, input, generate, and/or print documents. Accordingly, the user application may be a word-processing application, a spreadsheet application, a desktop publishing application, a graphics application, a photograph printing application, an Internet browser, etc. The user application may generate new documents, obtain previously saved documents, and/or input pages from a document scanner (not shown). Each document generated, obtained, and/or inputted by the user application may include one or more text blocks and/or one or more images.

In one or more embodiments of the invention, the printer driver (104) is software operatively connected to the printer (112) and configured to convert the data in the document to a specific format required by the printer (112). For example, in the case of page descriptor language (PDL) printing schemes, the printer driver (104) generates a print job described in page descriptor language (PDL) based on the document content and selected printing options. The PDL commands/instructions include various print objects (e.g., text objects, graphics objects, image objects) and control objects (e.g., blend and transparency commands, color management information) to describe the page for printing. As another example, in the case of raster printing, the printer driver (104) generates page images (i.e., rasterized image data such as bitmap data) based on the document content and the printing options, and sends the page images to the printer (112).

In one or more embodiments of the invention, the printer (112) generates hardcopy documents from incoming print jobs. In the case of PDL printing schemes (discussed above), the printer (112) interprets the PDL commands/instructions to generate page images (i.e., the printer (112) rasterizes the objects). The page images are then printed on a physical medium (e.g., paper, microfiche, microfilm, etc.). In the case of raster printing (discussed above), the printer (112) receives the actual page images and then prints them on the physical medium.

In one or more embodiments of the invention, the printer (112) operates in one of (or combinations of) various energy saving modes (i.e., modes that reduce energy consumed by the printer). Examples of energy saving modes include reduced energy print speed mode (i.e., printing at a speed that consumes less energy), black & white (BW) only mode (i.e., printing in black and white even if the document is a color document), batch printing mode, economy mode, and sleep mode (discussed below). In batch printing mode, the printer (112) must receive a pre-determined number of print jobs before the printer (112) starts generating hardcopy documents for any of the print jobs. In other words, the incoming print jobs are stored (e.g., in a buffer of the printer (112)) until the pre-determined number of print jobs have arrived. In sleep mode, the printer (112) is effectively turned off (i.e., low-power mode) until the printer (112) receives a print job. In economy mode, less toner or less ink is used to generate a hardcopy document. In one or more embodiments of the invention, when the printer (112) is not using any of the energy saving modes, the printer (112) is said to be in normal mode.

In one or more embodiments of the invention, the energy consumption module (108) is used to track and record energy consumed by the printer (112). The energy consumption module (108) may track energy consumed by the printer (112) during any time interval (e.g., hourly, daily, weekly, etc.). Further, the energy consumption module (108) may respond to queries (e.g., from the printer driver (104)) regarding the printer's (112) current and/or historical energy consumption. The energy consumption module (108) may also calculate and track energy limits and/or energy thresholds (discussed below) for each time interval.

In one or more embodiments of the invention, the energy module (108) is configured to invoke one or more of the printer's (112) energy saving options. Specifically, an energy saving option may be invoked when the energy consumed by the printer (112) since the start of the time interval satisfies a threshold. For example, the energy limit for the present time interval may be set as 1.500 kWh and the energy threshold for the present time interval may be set to 95% of the energy limit (though it could be any percent of the energy limit, including 100% of the energy limit). Once the printer (112) has consumed at least 1.425 kWh (i.e., 95% of 1.500 kWh) of energy during the present time interval, the energy consumption module (108) may invoke one or more energy saving options for the remainder of the time interval.

In one or more embodiments of the invention, the energy consumption module (108) calculates the energy limit for the present time interval based on the total energy consumed by the printer (112) during the previous (or a past) time interval. Specifically, any energy consumed during a time interval that exceeds the energy limit set for the time interval may be subtracted from the energy limit set for the next (or a future) time interval. For example, all time intervals may be initially assigned the same base energy limit of 1.500 kWh. If the printer (112) consumes 1.650 kWh during time interval A (i.e., 0.150 kWh in excess of the energy limit), the energy limit for future time interval B may be reduced to 1.350 kWh (i.e., 1.350 kWh=1.500 kWh−0.150 kWh). Alternatively, if the printer (112) consumed 1.250 kWh during time interval A (i.e., 0.250 kWh less then the base energy limit), the energy limit for future time interval B may be increased to 1.750 kWh (i.e., 1.750 kWh=1.500 kWh+0.250 kWh). In one or more embodiments of the invention, the energy consumption module (108) is located on the computing device (102) instead of the printer (112).

In one or more embodiments of the invention, any action taken by the energy consumption module (108) may be reversed/overridden by an administrator. Accordingly, even though the energy consumption module (108) may have invoked an energy saving mode of the printer (112) for the remainder of the interval, the administrator may submit a print job with instructions to restore (at least temporarily) the printer (112) to normal mode before printing the administrator's print job. The printer (112) may return to the energy saving mode after printing the administrator's print job in normal mode.

In one or more embodiments of the invention, the GUI (106) comprises a number of widgets (i.e., checkboxes, radio buttons, textboxes, etc.) corresponding to a number of printing options. A user may select one or more of the printing options by manipulating the appropriate widget(s). Accordingly, the GUI (106) is effectively used by the computing device (102) to collect selections made by the user. Further, any selections collected using the GUI (106) may be packaged as a PDL commands/instructions by the printer driver (104) and sent to the printer (112).

Figure 2:
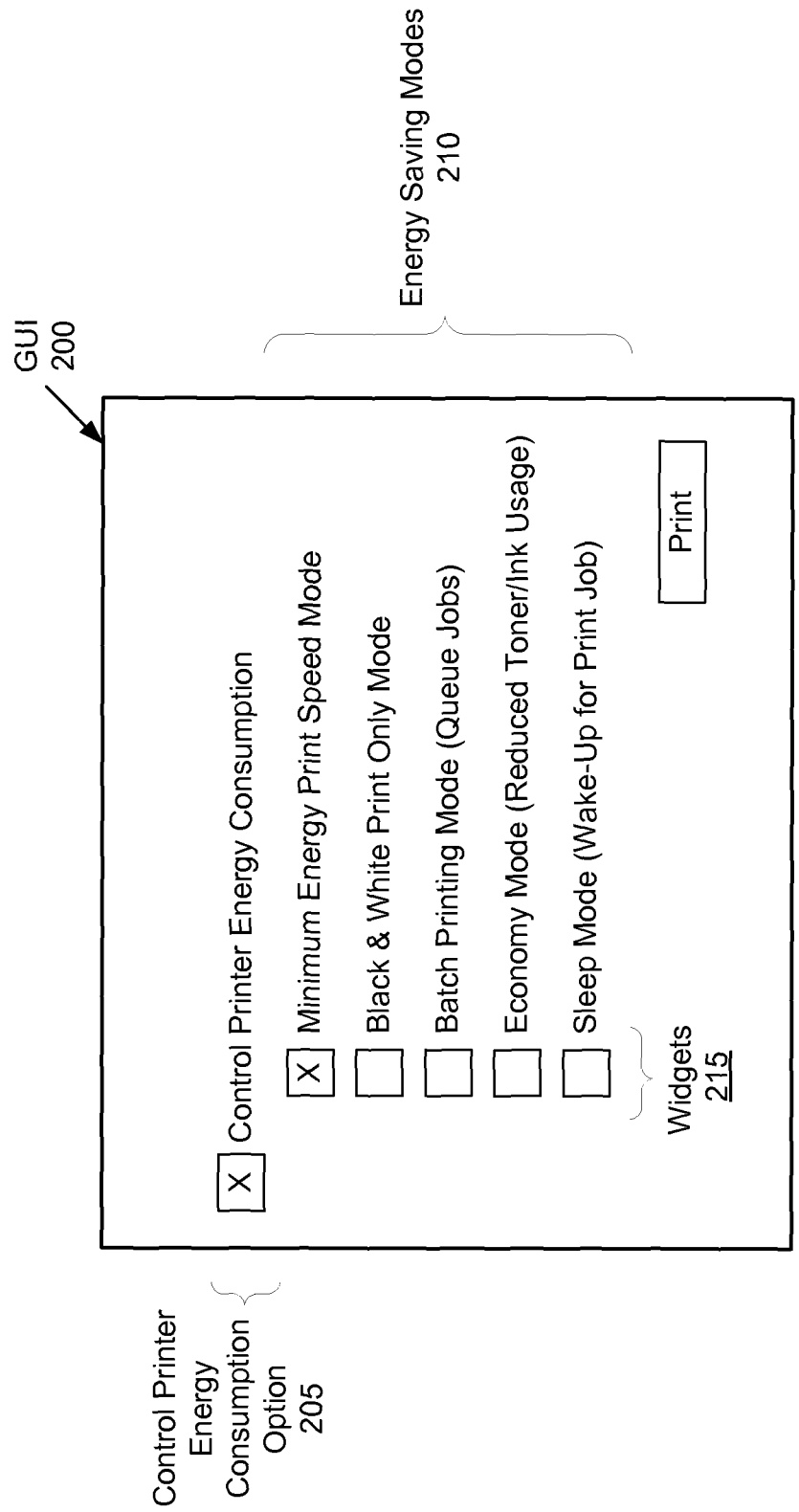
FIG. 2 shows a GUI in accordance with one or more embodiments of the invention.

FIG. 2 shows a GUI (200) in accordance with one or more embodiments of the invention. The GUI (200) is an example of the GUI (106), discussed above in FIG. 1. As shown in FIG. 2, the GUI (200) identifies an option to control energy consumed by the printer (205) and one or more energy saving modes (210) in which the printer (112) can operate. A user may enable the option to control energy consumed by the printer (205) and select the energy saving mode(s) (210) to invoke (discussed above) by manipulating the appropriate widgets (215) (i.e., checkboxes). Although not shown in FIG. 2, the GUI (200) may also include widgets (i.e., textboxes) for specifying energy limits and energy thresholds for various time intervals.

In one or more embodiments of the invention, the GUI (106) is implemented inside the printer (112). The printer administrator can activate or deactivate the GUI (106). Further, the printer administrator can choose energy saving method(s) to use from the front panel of the printer (112), and can force the energy saving method(s) on the print jobs of a non-privileged user even if the non-privileged user chooses to disable this energy saving mode from the printer driver (104).

Figure 3:
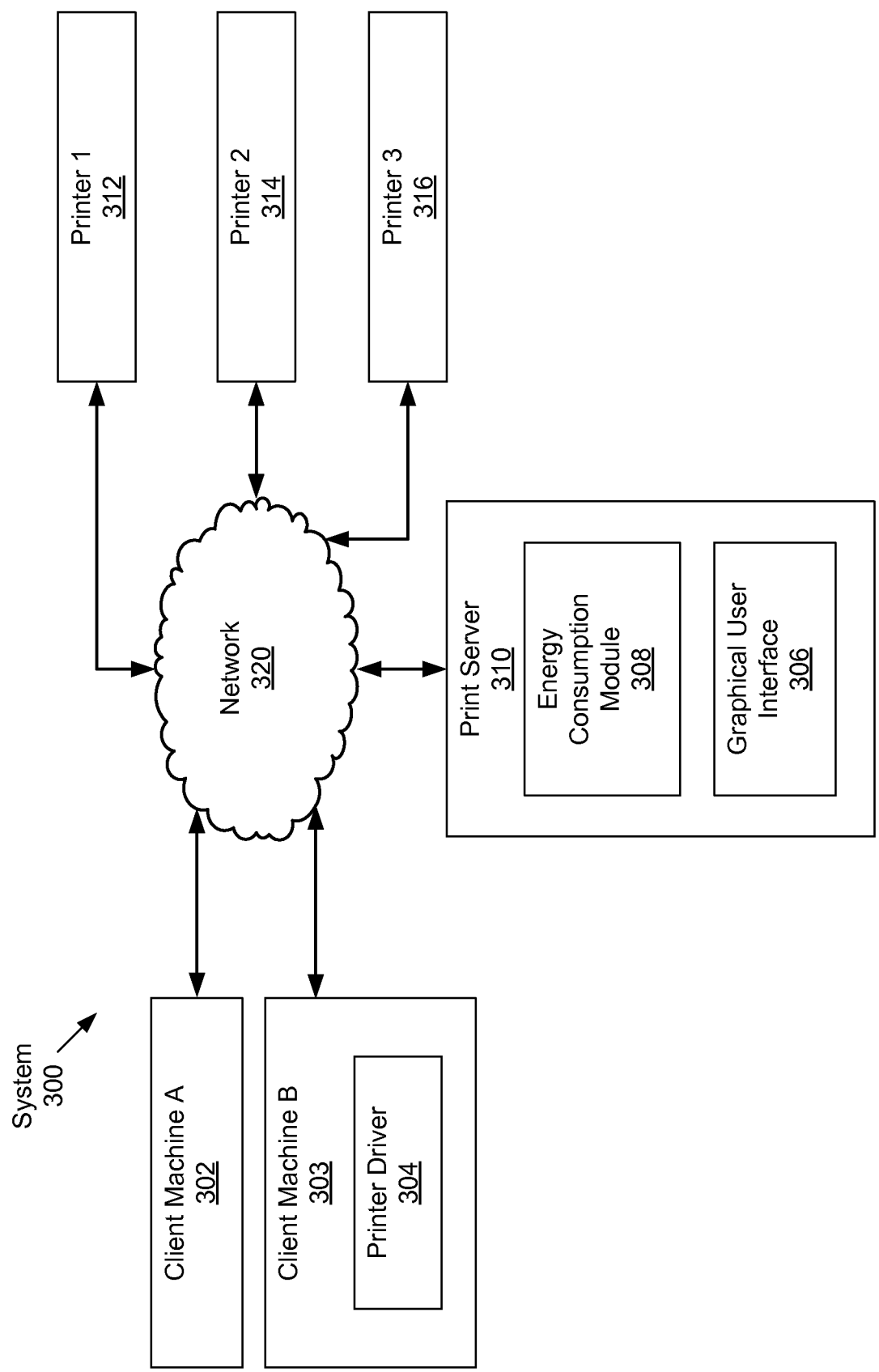
FIG. 3 shows a system in accordance with one or more embodiments of the invention.

FIG. 3 shows a system (300) in accordance with one or more embodiments of the invention. As shown in FIG. 3, the system (300) has multiple components including a collection of printers (i.e., Printer 1 (312), Printer 2 (314), Printer 3 (316)), multiple client machines (i.e., Client Machine A (302), Client Machine B (303)), and a print server (310). The client machines (302, 303), the printers (312, 314, 316), and the print server (310) are connected using a network (320) having wired and/or wireless segments.

In one or more embodiments of the invention, the client machines (302, 303) are essentially the same as the computing device (102) (discussed above in reference to FIG. 1). For example, the client machine B (303) has a printer driver (304). The printer driver (304) may be essentially the same as the printer driver (104), discussed above in reference to FIG. 1. In one or more embodiments of the invention, each of the printers (312, 314, 316) is essentially the same as the printer (112), discussed above in reference to FIG. 1.

In one or more embodiments of the invention, each printer (312, 314, 316) comprises an energy consumption rating (ECR). The ECR for a printer may fluctuate as the printer changes operating modes (e.g., normal mode, reduced energy print speed mode, batch printing mode, etc.). In one or more embodiments of the invention, each printer (312, 314, 316) is aware of its ECR and broadcasts its current ECR over the network (320). The various ECR values may be loaded into the printers (312, 314, 316) by the manufacturer(s) of the printers (312, 314, 316). Alternatively, the user may set the ECR values of each printer and prioritize printers according to the ECR values.

In one or more embodiments of the invention, the print server (310) is configured to accept print jobs issued by the client machine (302, 303) and submit the print jobs to the appropriate printers. In one or more embodiments of the invention, the energy consumption module (308) is used to track and record energy consumed by printers (312, 314, 316), as a group (i.e., aggregate energy consumption). The energy consumption module (308) may track energy consumed by the printers (312, 314, 316) during any time interval (e.g., hourly, daily, weekly, etc.). Further, the energy consumption module (308) may respond to queries (e.g., from the client machines (302, 303)) regarding the printers' (312, 314, 316) current and/or historical energy consumption. The energy consumption module (308) may also calculate and track energy limits and energy thresholds (discussed below) for each time interval, and the current ECR for each of the printers (312, 314, 316).

In one or more embodiments of the invention, the energy consumption module (308) is configured to redirect print jobs received from the client machines (302, 303) to substitute printers (i.e., printers having a lower ECR than the original printer). For example, assume printer 1 (312) has a current ECR of 4.75 W and printer 2 (314) has a current ECR of 3.5 W. An incoming print job for printer 1 (312) may be redirected to printer 2 (314) because printer 2 (314) has a smaller ECR. Specifically, a print job may be redirected when the energy consumed by the printers (312, 314, 316), as a group and since the start of the time interval, satisfies a threshold. For example, the energy limit for the present time interval may be set as 7.000 kWh and the energy threshold for the present time interval may be set to 90% of the energy limit. Once the printers (312, 314, 316), as a group, have consumed at least 6.300 kWh (i.e., 90% of 7.000 kWh) of energy during the present time interval, the energy consumption module (308) may start redirecting incoming print jobs to substitute printers for the remainder of the time interval.

As shown in FIG. 3, the print server (310) includes a GUI (306). The GUI (306) may be similar to the GUI (200), discussed above in reference to FIG. 2. In other words, GUI (306) may be used to specify the duration of time intervals, energy limits, and energy thresholds. However, unlike GUI (200), the GUI (306) identifies an option to control energy consumed by the printers (312, 314, 316), as a group (i.e., aggregate energy consumption).

In one or more embodiments of the invention, any action taken by the energy consumption module (308) may be reversed/overridden by an administrator. Accordingly, even though the energy consumption module (308) may be redirecting incoming print jobs to a printer having a lower ECR, the administrator may submit a print job with instructions to print the print job at a target printer regardless of the ECR of the target printer.

Figure 4:
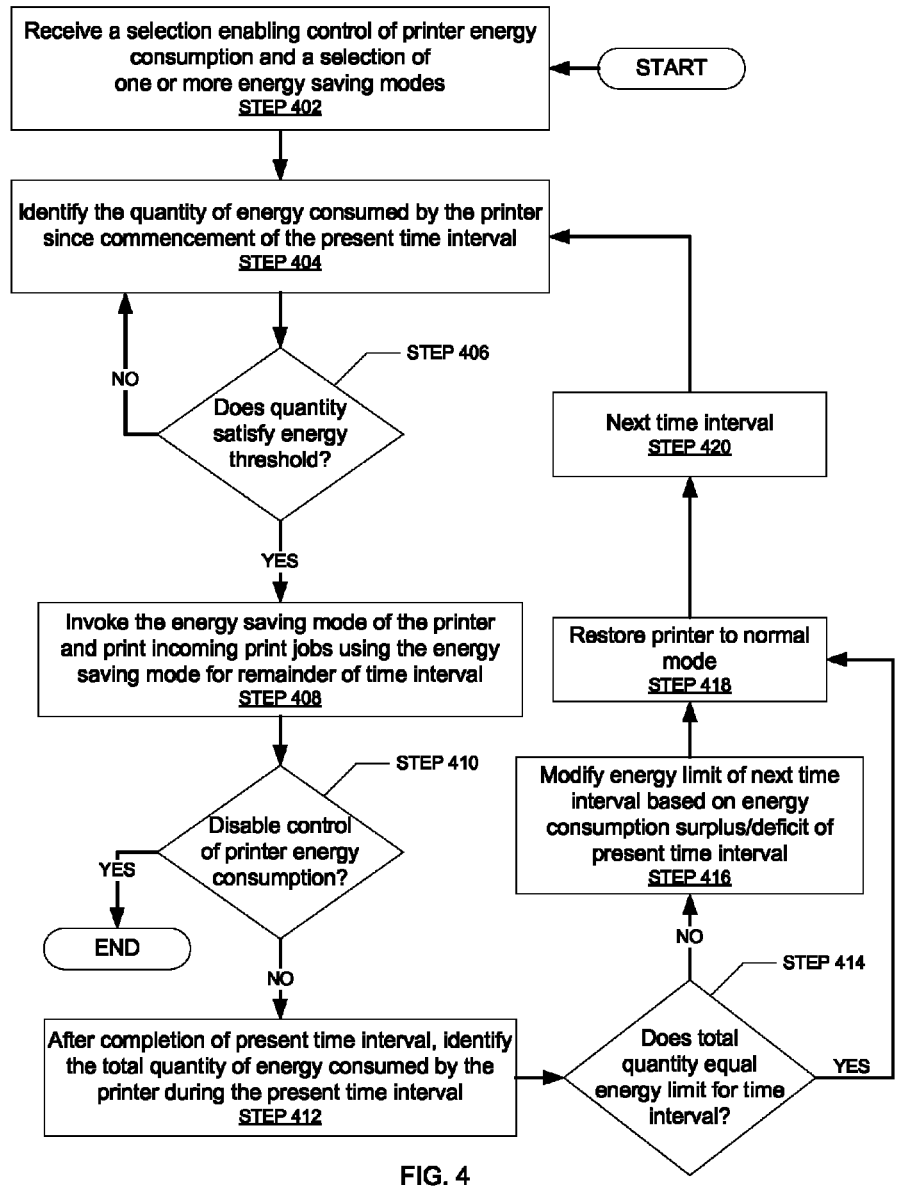
FIG. 4 and FIG. 5 show flowcharts in accordance with one or more embodiments of the invention.

FIG. 4 shows a flowchart in accordance with one or more embodiments of the invention. The process depicted in FIG. 4 may be implemented using the system (100), described above in reference to FIG. 1. The process shown in FIG. 4 may be carried out by a central processing unit (CPU) of the printer (112) using a software program stored in a memory, such as a read only memory (ROM) or hard disk drive (HDD). In this case, the CPU and random access memory (RAM) used for a work area constitute the energy consumption module (108). One or more steps shown in FIG. 4 may be omitted, repeated, and/or performed in a different order among different embodiments of the invention. Accordingly, embodiments of the invention should not be considered limited to the specific number and arrangement of steps shown in FIG. 4.

Initially, a selection enabling control of printer energy consumption and a selection of one or more energy saving modes are received by a printer (STEP 402). The selections may be executed by a user via a GUI (e.g., GUI (200), discussed above in reference to FIG. 2). Further, the selections may be received as PDL commands/instructions from a printer driver. Although not shown in FIG. 4, the durations of one or more time intervals, the energy limits for the one or more time intervals, and/or the energy thresholds for the one or more time intervals may also be received by the printer.

In STEP 404, the quantity of energy consumed by the printer since the start of the present time interval is identified. In one or more embodiments of the invention, STEP 404 is executed as a result of receiving the selection enabling control of printer energy consumption. Moreover, STEP 404 may be performed at any time and any number of times (i.e., repeated) after receiving the selection enabling control of printer energy consumption. The quantity of energy consumed may be identified by an energy consumption module (e.g., Energy Consumption Module (108), discussed above in reference to FIG. 1), which monitors and records the energy consumed by the printer during the present time interval while printing, loading paper, performing self-diagnostics, receiving print jobs, performing self-cleaning operations, responding to queries, idle, etc.

In STEP 406, it is determined whether the identified quantity of energy satisfies a pre-determined energy threshold for the present time interval. As discussed above, each time interval is assigned an energy limit. The pre-determined threshold may correspond to any percentage (e.g., 85%, 92.57%, 100%, etc.) of the energy limit. Further, in order to satisfy the energy threshold, the identified quantity of energy may need to equal or exceed the energy threshold. When it is determined that the identified quantity of energy does not satisfy the pre-determined energy threshold, the process returns to STEP 404. However, when it is determined that the identified quantity of energy does satisfy the pre-determined energy threshold, the process proceeds to STEP 408.

In STEP 408, the printer is set in at least one of the selected energy saving modes for the remainder of the present time interval. As discussed above, the printer can operate in one of (or combinations of) various energy saving modes. Examples of energy saving modes include reduced energy print speed mode, black & white (BW) only mode, batch printing mode, economy mode, and sleep mode. All print jobs arriving after the energy saving mode(s) are invoked may be printed (i.e., hardcopies of the print jobs will be generated) according to/using the invoked energy savings mode. However, as mentioned above, some administrators may have authority to override the invoked energy saving mode(s) (at least temporarily) and print using the normal mode of the printer.

In STEP 410, it is determined whether the control of printer energy consumption should be disabled. A command to disable the control of printer energy consumption may be received from a user (e.g., the user no longer wishes to limit/reduce printer energy consumption). When it is determined that control of printer energy should not be disabled (i.e., control of printer energy consumption should remain in force), the process proceeds to STEP 412. Otherwise, the printer may be restored to normal mode and the process ends.

In STEP 412, the total quantity of energy consumed by the printer during the entire time interval is identified. The quantity of energy consumed may be identified by an energy consumption module (e.g., Energy Consumption Module (108), discussed above in reference to FIG. 1), which monitors and records the energy consumed by the printer while printing, loading paper, performing self-diagnostics, receiving print jobs, performing self-cleaning operations, responding to queries, etc.

In STEP 414, it is determined whether the total quantity of energy equals (or falls within a pre-defined tolerance) of the energy limit for the time interval. Accordingly, STEP 414 may require calculating a difference between the total energy consumed and the energy limit. When it is determined that the total quantity of energy equals the energy limit for the time interval, the process proceeds to STEP 418, where the printer is restored to normal mode, and then STEP 420, where the process advances to the next time interval. However, when it is determined that the total quantity of energy does not equal (or falls outside the pre-defined tolerance) of the energy limit for the time interval, the process proceeds to STEP 416.

In STEP 416, the energy limit of the next time interval is modified based on an absolute difference between the energy limit of the present time interval and the total energy consumed by the printer during the present time interval. If the total energy consumed by the printer during the present time interval exceeded the energy limit for the present time interval (i.e., energy consumption deficit), the absolute difference is subtracted from the energy limit of the next time interval (or some future time interval). Alternatively, if the total energy consumed by the printer during the present time interval was less than the energy limit of the present time interval (i.e., energy consumption surplus), the absolute difference is added to the energy limit of the next time interval (or some future time interval).

Although the steps of FIG. 4 are presented as being executed by the printer, one or more steps in FIG. 4 may be executed by a printer driver (e.g., Printer Driver (104)) on a computing device (e.g., Computing Device (102)) connected to the printer. Specifically, the printer driver may identify the energy consumed by the printer, issue commands to the printer to invoke one or more energy savings modes, modify the energy limits of future time interval after calculating energy consumption deficits/surpluses, etc.

Further, although FIG. 4 only discusses a single energy threshold for each time interval, a time interval may have any number of energy thresholds. As more and more energy thresholds are satisfied during the time interval, more and more energy saving modes of the printer may be invoked. The order in which the multiple thresholds are invoked may be set by the user (i.e., the user may prioritize/rank the energy saving modes).

Figure 5:
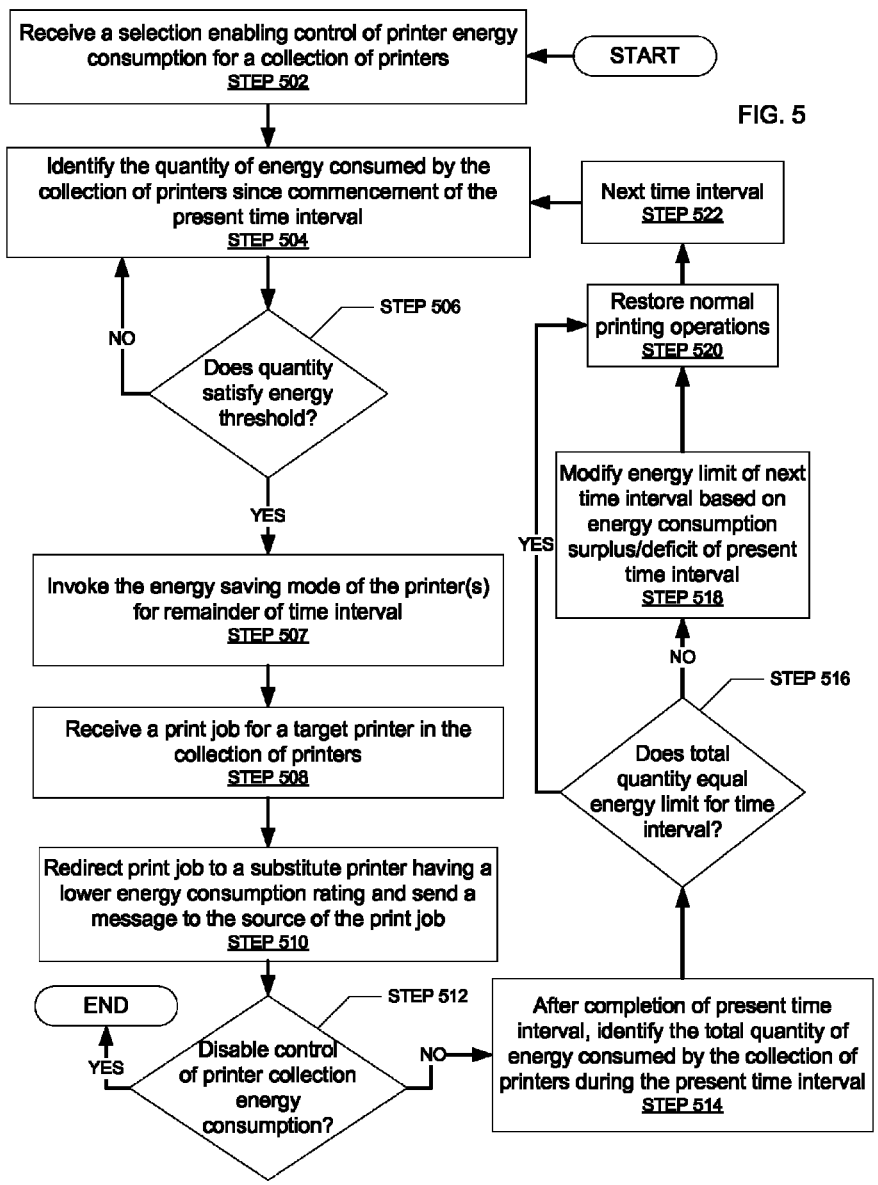

FIG. 5 shows a flowchart in accordance with one or more embodiments of the invention. The process depicted in FIG. 5 may be implemented using the system (300), described above in reference to FIG. 3. One or more steps shown in FIG. 5 may be omitted, repeated, and/or performed in a different order among different embodiments of the invention. Accordingly, embodiments of the invention should not be considered limited to the specific number and arrangement of steps shown in FIG. 5.

Initially, a selection enabling control of a printer collection's energy consumption is received (STEP 502) by a print server (e.g., Print Server (310), discussed above in reference to FIG. 3). The selection may be executed by a user interacting with the print server through a GUI (e.g., GUI (306)). Although not shown in FIG. 5, the durations of one or more time intervals, the energy limits for the one or more time intervals, and/or the energy thresholds for the one or more time intervals may also be received by the print server.

In STEP 504, the quantity of energy consumed by the collection of printers (i.e., aggregate energy consumption) since the start of the present time interval is identified. In one or more embodiments of the invention, STEP 504 is executed as a result of receiving the selection enabling control of printer energy consumption for the collection of printers. Moreover, STEP 504 may be performed at any time and any number of times (i.e., repeated) after receiving the selection. The quantity of energy consumed may be identified by an energy consumption module (e.g., Energy Consumption Module (308), discussed above in reference to FIG. 3), which monitors and records the energy consumed by the printers, as a group, during the present time interval while the printers print, load paper, perform self-diagnostics, receive print jobs, perform self-cleaning operations, respond to queries, idle, etc.

In STEP 506, it is determined whether the identified quantity of energy satisfies a pre-determined aggregate energy threshold for the present time interval. As discussed above, each time interval is assigned an aggregate energy limit. The pre-determined aggregate energy threshold may correspond to any percentage (e.g., 88.5%, 90.5%, 100%, etc.) of the aggregate energy limit. Further, in order to satisfy the aggregate energy threshold, the identified quantity of energy may need to equal or exceed the aggregate energy threshold. When it is determined that the identified quantity of energy does not satisfy the pre-determined energy threshold, the process returns to STEP 504. However, when it is determined that the identified quantity of energy does satisfy the pre-determined energy threshold, the process proceeds to STEP 507.

In STEP 507, one or more of the printers in the collection are set in at least one of the selected energy saving modes for the remainder of the present time interval. As discussed above, the printers can operate in one of (or combinations of) various energy saving modes. Examples of energy saving modes include reduced energy print speed mode, black & white (BW) only mode, batch printing mode, economy mode, and sleep mode. All print jobs arriving after the energy saving mode(s) are invoked may be printed (i.e., hardcopies of the print jobs will be generated) according to/using the invoked energy savings mode. However, as mentioned above, some administrators may have authority to override the invoked energy saving mode(s) (at least temporarily) and print using the normal mode of the printer.

In STEP 508, a print job for one of the printers in the collection (i.e., target printer) is received. The print job may be received from any source (e.g., Client Machine A (302) or Client Machine B (303), discussed above in reference to FIG. 3). In STEP 510, the print job is redirected to a printer within the collection having a lower ECR. As discussed above, each printer in the collection may broadcast its ECR. Moreover, the ECR of a printer may fluctuate as the printer changes operation modes. If the print job is redirected, a message is sent to the source of the print job regarding the printer substitution.

In STEP 512, it is determined whether the control of the printer collection's energy consumption should be disabled. A command to disable the control of the printer collection's energy consumption may be received from a user (e.g., the user no longer wishes to limit/reduce energy consumed by the collection of printers). When it is determined that control of the printer collection's energy should not be disabled (i.e., control of the printer collection's energy consumption should remain in force), the process proceeds to STEP 514. Otherwise, normal printing operations may be restored (no more redirecting of print jobs) and the process ends.

In STEP 514, the total quantity of energy consumed by the collection of printers (i.e., aggregate energy consumption) during the entire time interval is identified. The quantity of energy consumed may be identified by an energy consumption module (e.g., Energy Consumption Module (308), discussed above in reference to FIG. 3), which monitors and records the energy consumed by the printers while the printers print, load paper, perform self-diagnostics, receive print jobs, perform self-cleaning operations, respond to queries, idle, etc.

In STEP 516, it is determined whether the total quantity of energy equals (or falls within a pre-defined tolerance) of the aggregate energy limit for the time interval. Accordingly, STEP 516 may require calculating a difference between the total energy consumed and the aggregate energy limit. When it is determined that the total quantity of energy equals the energy limit for the time interval, the process proceeds to STEP 520, where normal printer operations are restored (i.e., print jobs are no longer redirected, printers in the collection are set back to normal mode, etc.), and then to STEP 522, where the process advances to the next time interval. However, when it is determined that the total quantity of energy does not equal (or falls outside the pre-defined tolerance) of the energy limit for the time interval, the process proceeds to STEP 518.

In STEP 518, the aggregate energy limit of the next time interval is modified based on an absolute difference between the aggregate energy limit of the present time interval and the total energy consumed by the collection of printers during the present time interval. If the total energy consumed by the collection of printers during the present time interval exceeded the aggregate energy limit for the present time interval (i.e., energy consumption deficit), the absolute difference is subtracted from the aggregate energy limit of the next time interval (or some future time interval). Alternatively, if the total energy consumed by the collection of printers during the present time interval was less than the energy limit of the present time interval (i.e., energy consumption surplus), the absolute difference is added to the energy limit of the next time interval (or some future time interval).

Figure 6:
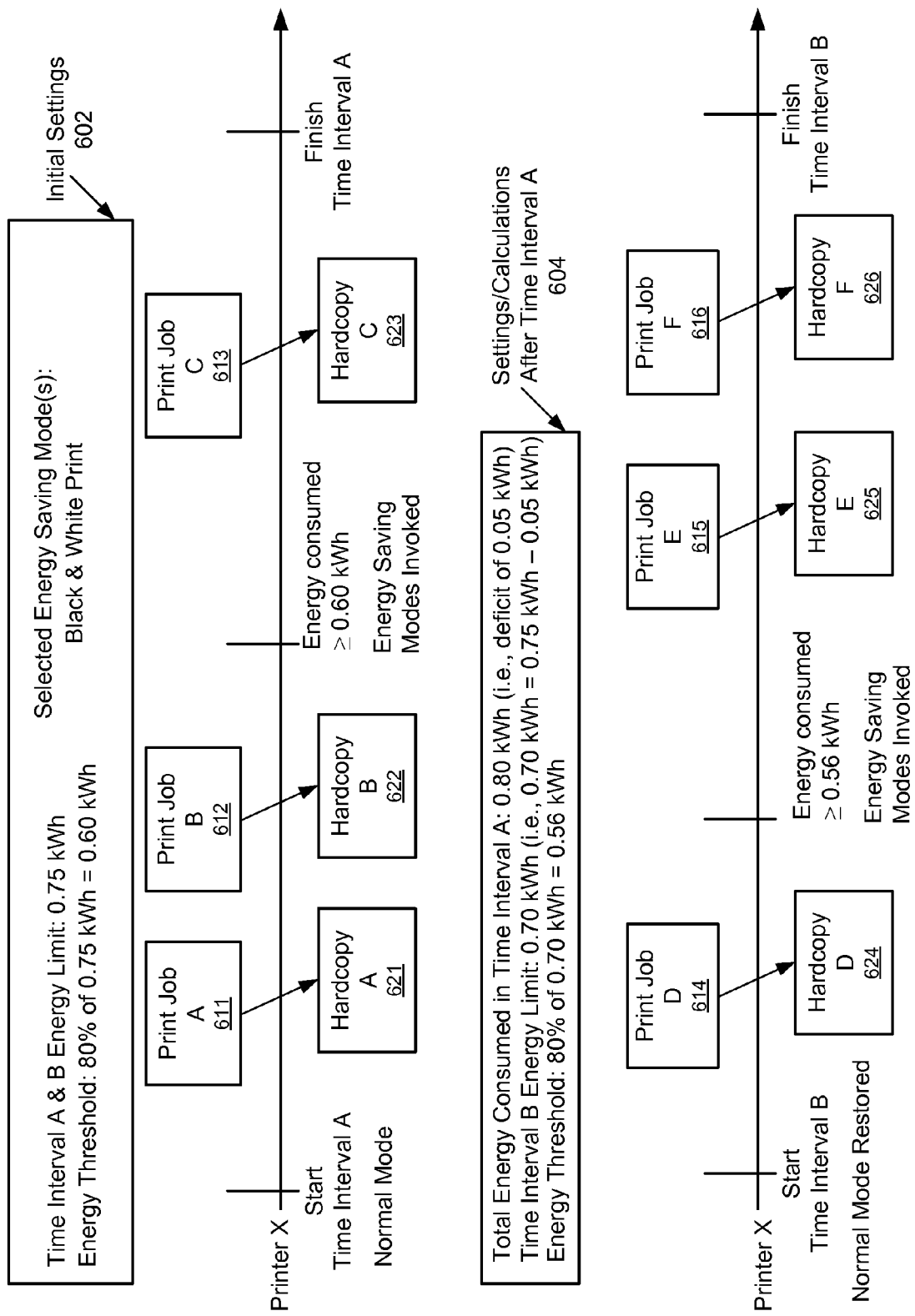
FIG. 6 shows an example in accordance with one or more embodiments of the invention.

FIG. 6 shows an example in accordance with one or more embodiments of the invention. In the example of FIG. 6, there exists a single printer (i.e., Printer X) and two time intervals: time interval A and time interval B. As shown in the initial settings (602), an energy limit of 0.75 kWh is assigned to both time interval A and time interval B. Further, the energy threshold for both time interval A and time interval B is 80% of the energy limit. Further still, a user has selected to control the energy consumption of Printer X using the B&W print only mode as the energy saving mode.

Still referring to FIG. 6, soon after the start of time interval A, the print job A (611) is received. In response to the print job A (611), the printer X generates the hardcopy document A (621). Next, the print job B (612) is received. In response to the print job B (612), the printer X generates the hardcopy document B (622). After generating hardcopy document B (622), it is determined that the quantity of energy consumed by Printer X since the start of time interval A (e.g., energy consumed to generate the hardcopy document A (621) and the hardcopy document B (622)) equals or exceeds the energy threshold (i.e., 0.6 kWh=80% of 0.75 kWh). Accordingly, the selected energy saving mode of Printer X is invoked for the remainder of the time interval A. The printer X generates the hardcopy document C (623) in response to receiving the print job C (613). However, as a result of the energy saving mode being invoked, the hardcopy document C (623) will be in black and white even if the print job C (613) corresponds to a color document.

Once time interval A is complete, multiple settings and calculations are performed (604). As shown in FIG. 6, the total quantity of energy consumed by the printer X during the time interval A was 0.8 kWh. However, this is 0.05 kWh in excess of the 0.75 kWh energy limit for the time interval A. Accordingly, the energy limit for the time interval B is reduced from 0.75 kWh to 0.7 kWh. Further, the printer X is returned to normal mode before the start of time interval B.

Soon after the start of time interval B, the print job D (614) is received. In response to the print job D (614), the printer X generates the hardcopy document D (624). After generating hardcopy document D (624), it is determined that the quantity of energy consumed by Printer X since the start of time interval B (e.g., energy consumed to generate the hardcopy document D (624)) equals or exceeds the energy threshold (i.e., 0.56 kWh=80% of 0.7 kWh). Accordingly, the selected energy saving mode of Printer X is invoked for the remainder of the time interval B. The printer X generates the hardcopy document E (625) and the hardcopy document F (626) in response to receiving the print job E (615) and the print job F (616), respectively. However, as a result of the energy saving mode being invoked, the hardcopy document E (625) and the hardcopy document F (616) will be in black and white even if the print job E (615) and the print job F (616) correspond to color documents.

Embodiments of the present invention may include one or more of the following advantages: the ability to record and monitor printer energy consumption, the ability to transfer energy consumption deficits/surpluses between time intervals, the ability invoke energy saving modes specifically selected by the user and based on thresholds set by the user, the ability to reduce energy consumption within a time interval and average energy consumption across multiple times intervals, the ability to reduce costs by reducing consumed energy, etc.

Figure 7:
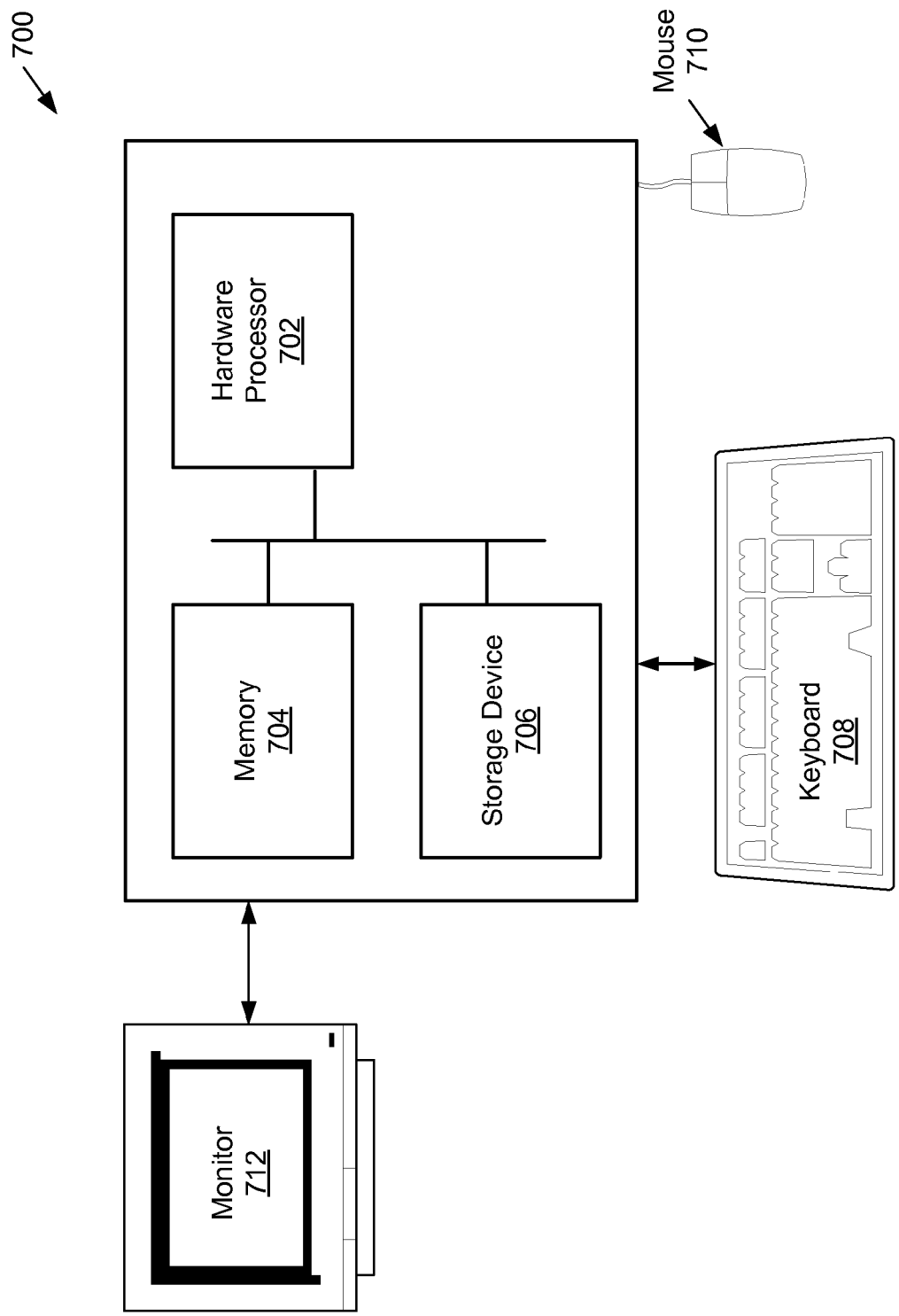
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more hardware processor(s) (702) (such as a central processing unit (CPU), integrated circuit, etc.), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer system (700) may also include input means, such as a keyboard (708), a mouse (710), or a microphone (not shown). Further, the computer system (700) may include output means, such as a monitor (712) (e.g., a liquid crystal display (LCD), a plasma display, or cathode ray tube (CRT) monitor) or audio speakers (not shown). The computer system (700) may be connected to a network (not shown) (e.g., a local area network (LAN), a wide area network (WAN), the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, in one or more embodiments of the invention, one or more elements of the aforementioned computer system (700) may be located at a remote location and connected to the other elements over a network. Further, embodiments of the invention may be implemented on a distributed system having a plurality of nodes, where each portion of the invention (e.g., printer driver (104), energy consumption module (108), etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a tape, memory, or any other tangible computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for controlling printer energy consumption, comprising:
   identifying, during a first time interval, a quantity of energy consumed by a printer since commencement of the first time interval;
   generating a comparison by comparing the quantity of energy with a first energy threshold for the first time interval;
   invoking an energy saving mode of the printer based on the comparison;
   calculating, after completion of the first time interval, a difference between a total quantity of energy consumed by the printer during the first time interval and a first energy limit for the first time interval;
   identifying a second energy limit for a second time interval; and
   calculating a modified energy limit for the second time interval by summing the second energy limit and the difference.

2. The method of claim 1, wherein invoking the energy saving mode comprises placing the printer in a low-power mode.

3. The method of claim 1, further comprising:
   receiving, by the printer and during the first time interval, a first print job after identifying the quantity of energy; and
   generating, by the printer and using the energy saving mode, a hardcopy document from the first print job.

4. The method of claim 3, wherein invoking the energy saving mode comprises setting the printer in a batch mode, and wherein generating the hardcopy document using the energy saving mode comprises:
   storing, by the printer, the first print job in a buffer;
   receiving, by the printer, a pre-determined number of print jobs after placing the first print job in the buffer; and
   printing the first print job in response to receiving the pre-determined number of print jobs.

5. The method of claim 3, wherein invoking the energy saving mode comprises setting the printer in a reduced energy print speed mode, and wherein generating the hardcopy document using the energy saving mode comprises printing the first print job using a reduced print speed.

6. The method of claim 3, wherein invoking the energy saving mode comprises setting the printer in a black and white print only mode, wherein generating the hardcopy document using the energy saving mode comprises printing the first print job in only black and white, and wherein the first print job corresponds to a color electronic document.

7. The method of claim 3, further comprising:
   receiving, by the printer and after invoking the energy saving mode, a second print job comprising a command to override the energy saving mode;
   disabling, by the printer, the energy saving mode in response to the command;
   printing, during the first time interval, the second print job after disabling the energy saving mode; and
   restoring the energy saving mode of the printer after printing the second print job.

8. The method of claim 1, further comprising:
   sending, by a printer driver and based on the comparison, a command to the printer to invoke the energy saving mode.

9. The method of claim 8, further comprising:
  displaying a graphical user interface (GUI) identifying a plurality of energy saving modes of the printer; and
  collecting, using the GUI, a selection of the energy saving mode from a user,
  wherein the command to invoke the energy saving mode is generated based on the selection.

10. The method of claim 1, wherein the difference is less than zero.

11. A method for controlling printer energy consumption, comprising:
  identifying, during a time interval, a quantity of energy consumed by a plurality of printers since commencement of the time interval,
    wherein the plurality of printers comprises a first printer having a first energy consumption rating (ECR) and a second printer having a second ECR;
  generating a comparison by comparing the quantity of energy with an aggregate energy threshold for the time interval;
  receiving a print job for a first printer of the plurality of printers after generating the comparison;
  redirecting, based on the comparison and in response to the first ECR exceeding the second ECR, the print job to the second printer of the plurality of printers; and
  sending a message identifying the second printer to a source of the print job.

12. A non-transitory computer readable storage medium storing instructions for controlling printer energy consumption, the instructions comprising functionality to:
  identify, during a first time interval, a quantity of energy consumed by a printer since commencement of the first time interval;
  generate, a comparison by comparing the quantity of energy with a first energy threshold for the first time interval;
  invoke an energy saving mode of the printer based on the comparison;
  calculate, after completion of the first time interval, a difference between a total quantity of energy consumed by the printer during the first time interval and a first energy limit for the first time interval;
  identify a second energy limit for a second time interval; and
  calculate a modified energy limit for the second time interval by summing the second energy limit and the difference.

13. The non-transitory computer readable storage medium of claim 12, wherein the instructions to invoke the energy saving mode comprise functionality to place the printer in a low-power mode.

14. The non-transitory computer readable storage medium of claim 12, the instructions further comprising functionality to:
  receive, during the first time interval, a first print job after identifying the quantity of energy; and
  generate, by the printer and using the energy saving mode, a hardcopy document from the first print job.

15. The non-transitory computer readable storage medium of claim 14, wherein
  store the first print job in a buffer of the printer;
  receive a pre-determined number of print jobs after placing the first print job in the buffer; and
  print the first print job in response to receiving the pre-determined number of print jobs.

16. The non-transitory computer readable storage medium of claim 14, wherein the instructions to invoke the energy saving mode comprises functionality to set the printer in a reduced energy print speed mode, and wherein the instructions to generate the hardcopy document using the energy saving mode comprise functionality to print the first print job using a reduced print speed.

17. The non-transitory computer readable storage medium of claim 12, wherein the difference is less than zero.

18. A system for controlling printer energy consumption, comprising:
  a GUI configured to collect a selection of a energy saving mode;
  a printer driver operatively connected to the GUI and configured to send the selection of the energy saving mode and a first print job to a printer; and
  an energy consumption module executing on a hardware processor and operatively connected to the print driver, wherein the energy consumption module is configured to:
    identify, during a first time interval, a quantity of energy consumed by the printer since commencement of the first time interval;
    generate a comparison by comparing the quantity of energy with a first energy threshold for the first time interval;
    invoke, based on the selection and the comparison, the energy saving mode of the printer;
    calculate, after completion of the first time interval, a difference between a total quantity of energy consumed by the printer during the first time interval and a first energy limit for the first time interval;
    identify a second energy limit for a second time interval; and
    calculate a modified energy limit for the second time interval by summing the second energy limit and the difference.

19. The system of claim 18, wherein the printer generates a hardcopy document from the first print job using the energy saving mode.

20. The system of claim 19, wherein the printer is configured to:
  store, in response to the selection, the first print job in a buffer;
  receive a pre-determined number of print jobs after placing the first print job in the buffer; and
  print the first print job in response to receiving the pre-determined number of print jobs.

21. The system of claim 19, wherein the energy consumption module is further configured to:
  disable, in response to an override command, the energy saving mode of the printer;
  print, during the first time interval, a second print job after the energy saving mode is disabled; and
  restore the energy saving mode of the printer after printing the second print job.

22. The system of claim 19, wherein invoking the energy saving mode comprises setting the printer in a reduced energy print speed mode, and wherein generating the hardcopy document using the energy savings mode comprises printing the first print job with a reduced print speed.

23. The system of claim 18, wherein the difference is less than zero.

* * * * *